(12) United States Patent
Chou et al.

(10) Patent No.: US 6,525,688 B2
(45) Date of Patent: Feb. 25, 2003

(54) LOCATION-DETERMINATION METHOD AND APPARATUS

(75) Inventors: Andrew Chou, Daly City, CA (US); Benjamin Van Roy, San Mateo, CA (US); John Tsitsiklis, Lexington, MA (US)

(73) Assignee: Enuvis, Inc., South San Francisco ( * ) Notice: Subject to any disclaimer, the term of this patent is extended or adjusted under 35 U.S.C. 154(b) by 0 days.

(21) Appl. No.: 09/885,870

(22) Filed: Jun. 20, 2001

(65) Prior Publication Data

US 2002/0097181 A1 Jul. 25, 2002

Related U.S. Application Data

(63) Continuation-in-part of application No. 09/730,324, filed on Dec. 4, 2000.
(51) Int. Cl.[7] .................................................. G01S 5/14
(52) U.S. Cl. .............................. 342/357.06; 342/357.12
(58) Field of Search ......................... 342/357.12, 357.15, 342/357.06; 701/213

(56) References Cited

U.S. PATENT DOCUMENTS 6,121,923 A * 9/2000 King ..................... 342/357.12
6,191,731 B1 * 2/2001 McBurney et al. ..... 342/357.05

* cited by examiner

Primary Examiner—Gregory C. Issing
(74) Attorney, Agent, or Firm—Edward C. Kwok, Esq.; Stefano Casaoei

(57) ABSTRACT

Some embodiments of the invention provide a location-determination system that includes several transmitters and at least one receiver. Each transmitter transmits a signal that includes a unique periodically-repeating component, and the receiver receives a reference signal. Based on the received reference signal, the location-determination system identifies an estimated location of the receiver as follows. For each transmitter in a set of transmitters, the system computes a phase offset between the received reference signal and a replica of the transmitter's periodically-repeating component. The system also identifies an approximate location of the receiver and an approximate receive time for the received signal. The system then uses the identified approximate location and time, and the computed phase offsets, to compute pseudoranges for the set of transmitters. Finally, the system identifies the estimated location of the receiver by using the computed pseudoranges.

28 Claims, 10 Drawing Sheets

LOCATION-DETERMINATION METHOD AND APPARATUS

CROSS-REFERENCE TO RELATED APPLICATION

This application is a continuation-in-part of U.S. patent application, entitled "Method and Apparatus for Determining Location Using a Thin-Client Device," filed on Dec. 4, 2000, and having Ser. No. 09/730,324.

FIELD OF THE INVENTION

The invention is related to location-determination method and apparatus.

BACKGROUND OF THE INVENTION

In many applications, it is necessary to estimate the location of objects in their environment. To date, numerous location-determination systems have been proposed for this task. One such system is the global positioning system (GPS). This system includes a number of satellites that orbit the Earth. It also includes GPS receivers, monitoring stations, and differential GPS receivers on Earth.

GPS satellites transmit signals from which GPS receivers can estimate their locations on Earth. A GPS satellite signal typically includes a composition of: (1) carrier signals, (2) pseudorandom noise (PRN) codes, and (3) navigation data. GPS satellites transmit at two carrier frequencies. The first carrier frequency is approximately 1575.42 MHz, while the second is approximately 1227.60 MHz. The second carrier frequency is predominantly used for military applications.

Each satellite uses two PRN codes to modulate the first carrier signal. The first code is a coarse acquisition (C/A) code. This code is a sequence of 1023 elements, called chips, and it modulates at an approximately 1 MHz rate. The second code is a precise (P) code, which repeats on a seven-day cycle and modulates at a 10 MHz rate. Different PRN codes are assigned to different satellites in order to distinguish GPS signals transmitted by different satellites.

The navigation data is superimposed on the first carrier signal and the PRN codes. The navigation data is transmitted as a sequence of five frames. Each frame is six seconds long, and it contains a time stamp for when the frame was transmitted. The navigation-data frames also provide information about the satellite's clock errors, the satellite's orbit (i.e., ephemeris data) and other system status data. A GPS satellite receives its ephemeris data from monitoring stations that monitor ephemeris errors in its altitude, position, and speed.

Based on the signals transmitted by the GPS satellites, GPS techniques typically estimate the location of a GPS receiver by using a triangulation method, which typically requires the acquisition and tracking of at least four satellite signals at the 1.57542 GHz frequency. GPS signal acquisition often involves correlation calculations between the received GPS signal and the C/A code of each satellite at various phase offsets and Doppler-shifted frequencies. Code phase and phase delay are other names for phase offset. For each satellite, GPS acquisition techniques record the largest-calculated correlation value as well as the phase offset and Doppler-shifted frequency resulting in this value. GPS acquisition techniques then identify several satellites (e.g., the four satellites) that resulted in the highest-recorded correlation values.

After signal acquisition, a signal tracking process decodes the signals from the identified satellites at the phase offsets and Doppler values associated with the recorded correlation values for these satellites. Specifically, the signal tracking process uses the identified phase offset and Doppler values for the identified satellites to extract each identified satellite's navigation data. Part of the extracted data is the time stamp information.

From the extracted time data, the signal tracking process can compute the distance between the receiver and the identified satellites. In particular, a satellite's signal-transmission delay (i.e., the time for a signal to travel from the satellite to the receiver) can be calculated by subtracting the satellite's transmission time (i.e., the satellite's extracted time stamp) from the time the receiver received the satellite's signal. In turn, the distance between the receiver and a satellite can be computed by multiplying the satellite's signal-transmission delay by the speed of light. The estimated or exact distance between the receiver and a satellite is often referred to as the satellite's pseudorange.

After signal tracking, a triangulation process typically computes the location of the GPS receiver based on the computed pseudoranges and the locations of the satellites. The location of each satellite identified during signal acquisition can be calculated from the satellite's ephemeris data. Theoretically, triangulation requires the computation of pseudoranges and locations of only three satellites. However, triangulation methods often use the pseudoranges and locations of four satellites because of inaccuracies in the receiver clock.

Some GPS systems also improve their accuracy by using differential GPS techniques. Such a technique requires the operation of differential GPS receivers at known locations. Unlike regular GPS receivers that use timing signals to calculate their positions, the differential GPS receivers use their known locations to calculate timing errors due to the signal path. These differential GPS receivers determine what the travel time of the GPS signals should be, and compare them with what they actually are. Based on these comparisons, the differential GPS receivers generate "error correction" factors, which they relay to nearby GPS receivers. The GPS receivers then factor these errors into their calculation of the transmission delay.

Signal tracking has a number of disadvantages. For instance, it is computationally intensive, and hence quite time consuming. Also, signal tracking at worst needs 6 seconds, and on average needs 3 seconds, of GPS data to extract a selected satellite's time stamp, as the time stamp is embedded in the navigation-data frames that are 6 seconds long. This requirement, in turn, reduces the speed of the location-determination process. Finally, signal tracking and reliable decoding of data require higher signal power than that needed for acquisition. This becomes a significant impediment when the GPS signal is attenuated, as in indoor or urban environments.

Therefore, there is a need for a global positioning system that can quickly identify a GPS receiver's location. There is also a need for a global positioning system that only needs a small amount of received GPS data to identify the GPS receiver's location. More generally, there is a need for a location-determination system that addresses some or all of the above-mentioned needs.

SUMMARY OF THE INVENTION

Some embodiments of the invention provide a location-determination system that includes several transmitters and at least one receiver. Each transmitter transmits a signal that includes a unique periodically-repeating component, and the receiver receives a reference signal. Based on the received reference signal, the location-determination system identifies an estimated location of the receiver as follows. For each transmitter in a set of transmitters, the system computes a phase offset between the received reference signal and a replica of the transmitter's periodically-repeating component. The system also identifies an approximate location of the receiver and an approximate receive time for the received signal. The system then uses the identified approximate location and time, and the computed phase offsets, to compute pseudoranges for the set of transmitters. Finally, the system identifies the estimated location of the receiver by using the computed pseudoranges.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
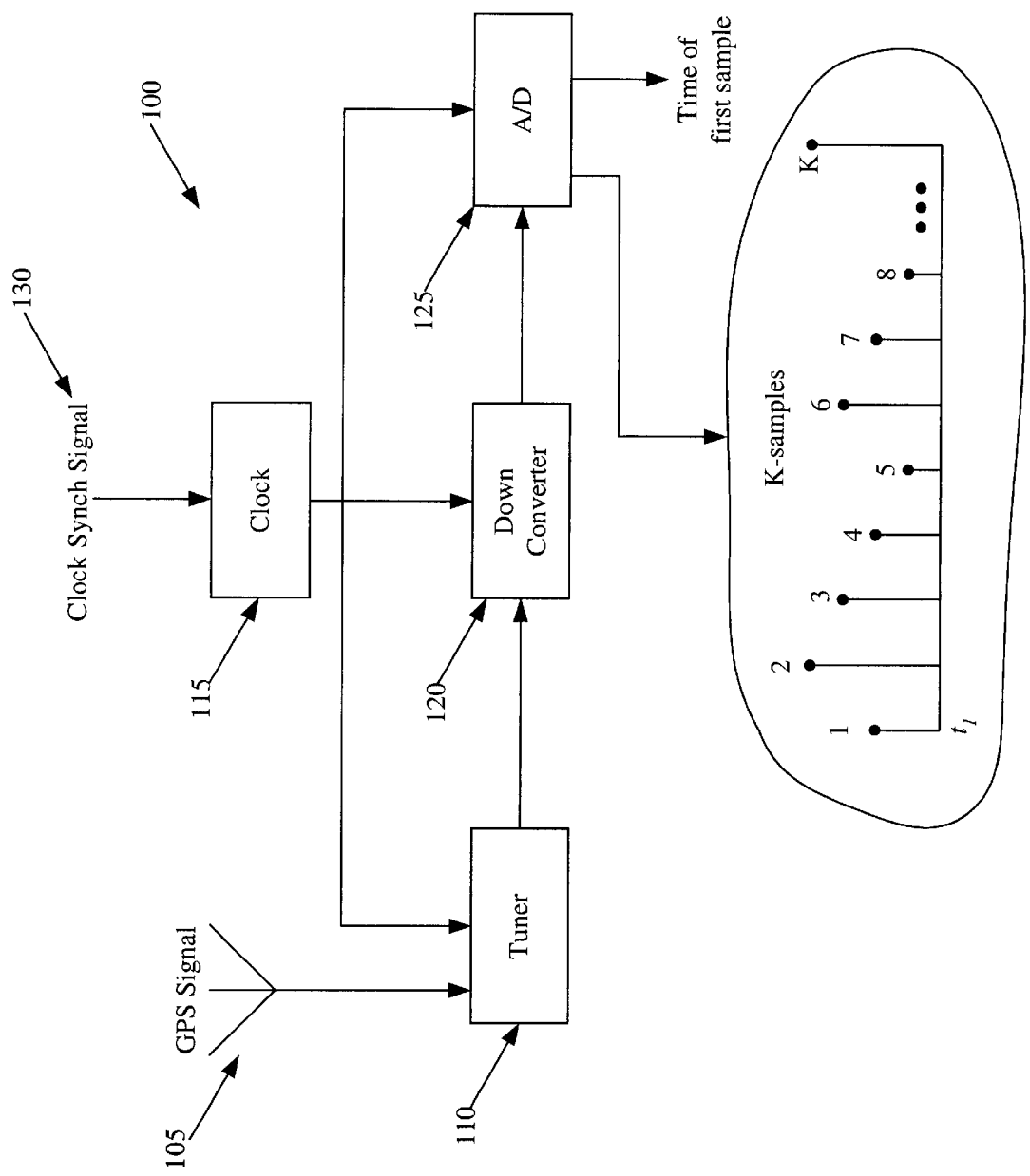
FIG. 1 illustrates a signal processing circuit that receives a GPS signal and generates a number of digital samples from this GPS signal.

The invention provides location-determination method and apparatus. In the following description, numerous details are set forth for purpose of explanation. However, one of ordinary skill in the art will realize that the invention may be practiced without the use of these specific details. For instance, some embodiments of the invention are described below by reference to global positioning systems. One of ordinary skill will understand that other embodiments of the invention are used in other types of location-determination systems. In other instances, well-known structures and devices are shown in block diagram form in order not to obscure the description of the invention with unnecessary detail.

Some embodiments of the invention are location determination systems that determine location of receivers from "reference signals" received by the receivers. As used in this document, a reference signal means any type of signal from which location information may be derived. Hence, the reference signal can be a GPS ("global positioning system") signal, a CDMA ("code division multiple access") signal, a GSM ("global system for mobile communication") signal, a TDMA ("time division multiple access") signal, a CDPD ("cellular digital packet data") signal, or any other signal from which location information may be derived.

In the embodiments described below, however, the reference signal is a GPS signal that can be used to estimate the location of GPS receivers. On Earth, a GPS receiver typically receives a GPS signal that is a composite of several signals transmitted by GPS satellites that orbit the Earth. The characteristics of such GPS-satellite signals were described in the background section.

The GPS receiver can be a standalone device, can be part of another mobile device (e.g., a personal digital assistant ("PDA"), wireless telephone, etc.), or can communicatively connect to another mobile device (e.g., connect to a Handspring Visor PDA through its proprietary Springboard). Several such architectures for the GPS receiver are described in U.S. patent application, entitled "Method and Apparatus for Determining Location Using a Thin-Client Device," filed on Dec. 4, 2000, and having Ser. No. 09/730,324. The disclosure of this application (i.e., U.S. patent application, entitled "Method and Apparatus for Determining Location Using a Thin-Client Device," filed on Dec. 4, 2000, and having Ser. No. 09/730,324) is incorporated herein by reference.

Some embodiments estimate the location of a GPS receiver by (1) initially generating K-digital samples $s_1, \ldots, s_K$ from the GPS reference signal received by the receiver, and then (2) using the digitized GPS reference data to estimate the location of the GPS receiver. The GPS receiver typically performs the digitization operation. Also, in some embodiments, the GPS receiver digitizes only a portion of the received GPS signal. An example of a signal-processing circuit that a GPS receiver can use to generate such samples will be described below by reference to FIG. 1.

Some embodiments estimate the location of the GPS receiver from the digitized GPS reference data by using a location-determination process that can be performed either (1) completely by the GPS receiver, (2) completely by another device or computer in communication with the GPS receiver, or (3) partially by the GPS receiver and partially by another device or computer in communication with the GPS receiver.

In some embodiments, the location-determination process computes pseudoranges for a set of satellites without performing signal tracking on the received GPS reference data. In some of these embodiments, the process computes for each satellite in the set a phase offset between the samples of the received reference signal and a replica of the satellite's PRN code. The system also identifies an approximate location of the receiver and an approximate receive time (e.g., an approximate time for the start of the received signal).

The system then uses the receiver's approximate location, approximate receive time, and the computed phase offsets to compute pseudoranges for the set of satellites. To compute a satellite's pseudorange, some embodiments use the satellite's computed phase offset and the receiver's approximate location to calculate the length of all or most of the PRN codes transmitted by the satellite from the time that it transmitted the signal resulting in the first sample $s_1$ to the time the receiver generated the first sample $s_1$. Finally, the system identifies the estimated location of the receiver by using the computed pseudoranges.

In certain circumstances, the estimated receiver location matches the exact receiver location. In other circumstances, the estimated receiver location matches the exact receiver location to such a high degree of accuracy that it is indistinguishable from the exact location to an observer. In yet other situations, however, the estimated location differs from the actual location of the GPS receiver by a certain error amount; in these situations, some embodiments take steps to ensure that this error (between the estimated and actual receiver locations) is tolerable for the particular location-determination application. Several more specific location-determination processes will be explained by reference to FIGS. 2–10.

I. Generating the Digital Reference Data

FIG. 1 illustrates a signal processing circuit 100 that receives a GPS signal and generates K-digital samples from the GPS signal. As shown in this figure, the signal processing circuit 100 includes a GPS antenna 105, a GPS tuner 110, a clock 115, a down-converter 120, and an analog to digital ("A/D") converter 125.

The GPS antenna 105 receives a GPS signal $\check{s}(t)$, which on Earth is a composite of noise and several signals transmitted by several GPS satellites that orbit the Earth. The antenna 105 and its associated circuitry are configured to receive the reference GPS signal $\check{s}(t)$ at a GPS carrier frequency, which currently is around 1.57 gigahertz ("Ghz"). The RF tuner 110 receives the GPS signal $\check{s}(t)$ from the antenna 105. This tuner 110 is tuned to capture signals at the approximate frequency of the GPS signal. Hence, the tuner captures the GPS reference signal $\check{s}(t)$ received by the antenna 105.

The RF tuner communicatively couples to the clock 115 to receive a clock signal. The clock 115 generates one or more clock signals to synchronize the operation of the components of the signal-processing circuit 100. This clock also receives a synchronizing clock signal 130. The clock 115 can receive the synchronizing signal 130 from a variety of sources. For instance, in some embodiments, the signal-processing circuit 100 includes an RF processing circuit that (1) captures a radio signal with the synchronizing signal, and (2) supplies this signal to the clock 115.

The synchronizing signal allows the clock to set initially its internal time. It also allows the clock to synchronize with a reference clock. In some embodiments, the receiver is part of a network (e.g., a wireless telephone network) and its clock 115 is synchronized with the network clock so as to keep the receiver clock within a few micro- or milli-seconds of the GPS clock. Some embodiments synchronize the clock 115 to be within 1 millisecond or less of the GPS clock. The degree of the receiver clock's inaccuracy will depend on (1) source and manner of obtaining the synchronizing signal 130, (2) the accuracy of the clock of the synchronizing-signal source, and (3) the accuracy of the GPS-receiver clock.

It should be noted that other embodiments use other techniques to maintain the receiver clock within a desired time interval of GPS time. For instance, some embodiments might have the receiver estimate and compensate for its clock drift internally. Other embodiments use high-precision clocks in their receivers.

As shown in FIG. 1, the down converter 120 receives the tuner's output (i.e., receives the captured GPS reference signal $\check{s}(t)$). The down converter 120 transforms the captured GPS reference signal to an intermediate frequency ("IF") reference signal $\check{s}(t)$. To do this, the down converter includes in some embodiments an IF mixer that converts the frequency of the captured GPS signal to an IF frequency, such as 50 Mhz. In some embodiments, the down converter also includes one or more band pass and amplification stages to filter and amplify the input and/or output of the IF mixer.

The signal-processing circuit 100 utilizes a down converter so that the A/D converter 125 can sample the reference signal at an intermediate frequency as opposed to a radio frequency. One of ordinary skill will understand that other embodiments can include more than one down converter in their signal-processing circuits. Also, some embodiments use one or more down converters to convert the GPS reference signal to a baseband reference signal, which can then be sampled by the A/D converter.

In some embodiments, the A/D converter's sampling rate is at least twice the size of the frequency band, while in other embodiments the sampling rate differs from this rate. The A/D converter 125 samples the IF reference GPS signal $\bar{s}(t)$ that it receives from the down converter 120, and outputs K-digital samples $s_1, \ldots, s_K$ of the IF GPS signal $\bar{s}(t)$. These samples are from only a portion of the received GPS signal, and serve as digital GPS reference data that the location determination processes use.

These samples are taken at GPS times $t_1, \ldots, t_K$. The corresponding receiver clock times are denoted by $\tilde{t}_1, \ldots, \tilde{t}_K$. Hence, $\tilde{t}_1$ represent the receiver clock time recorded when the first sample of the GPS signal is received at the receiver. The first-sample time $\tilde{t}_1$ represents the approximate time for when the first sample was generated because it is measured according to the receiver's clock, which is not completely synchronized with the GPS time in the embodiments described below. The A/D converter also outputs the first-sample time $\tilde{t}_1$. In this document, a "tilde" is generally placed over a variable (like $\tilde{t}_1$) to indicate that the value of the variable is an approximation of the actual value of the item represented by the variable.

II. Estimating the Location of the GPS Receiver

Figure 2:
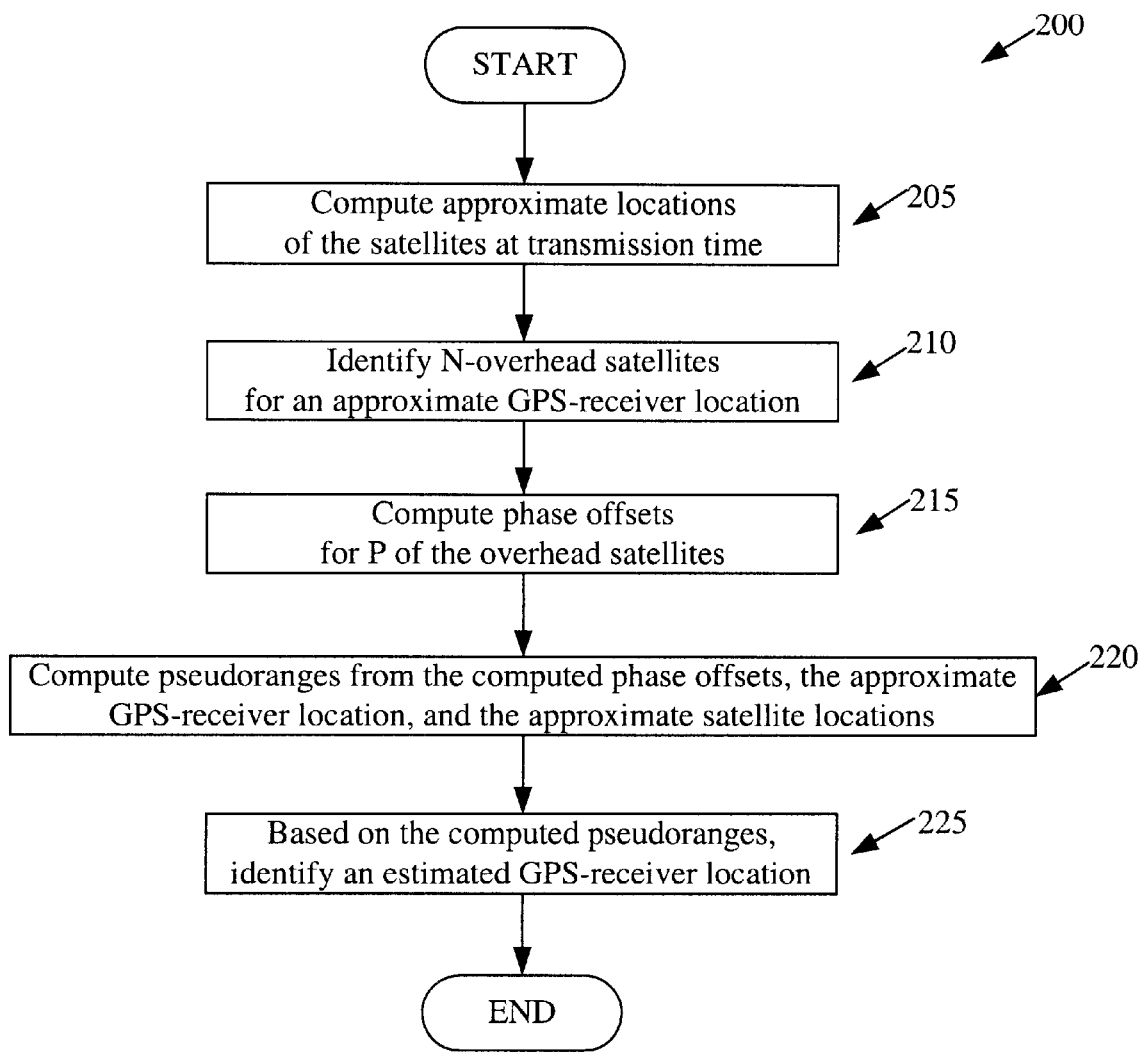
FIG. 2 illustrates a process that determines the location of the GPS receiver from the digital samples generated by the signal-processing circuit.

FIG. 2 illustrates a location-determination process 200 that estimates the location of the GPS receiver from the digital samples generated by the signal-processing circuit 100. In the embodiments described below, a location-determination server separate from the GPS receiver performs this process 200. One of ordinary skill will also realize that in other embodiments, the process 200 is performed either (1) completely by the GPS receiver, or (2) partially by the GPS receiver and partially by another device or computer (e.g., a location-determination server) in communication with the GPS receiver.

Figure 3:
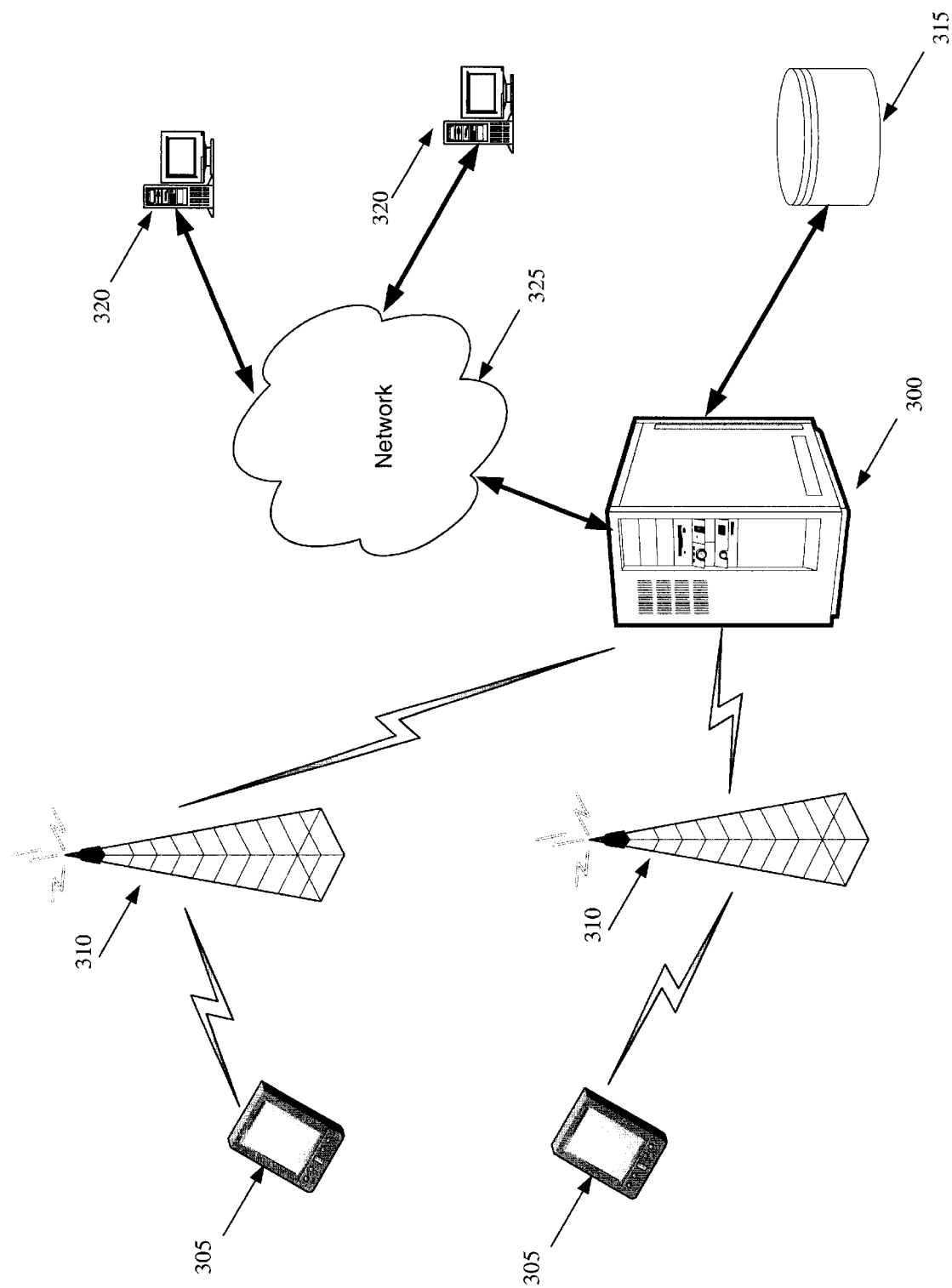
FIG. 3 illustrates a location-determination system.

FIG. 3 illustrates a location-determination server 300 that performs the process 200. In some embodiments, this server is just one computer, while in other embodiments several computers form this server. In some embodiments, these several computers may be geographically distributed. This server can be a standalone device or it can be part of other devices.

As shown in FIG. 3, the location-determination server 300 receives digital GPS reference data $s_1, \ldots, s_K$ from client devices 305 through one or more base stations 310. A client device 305 is either a GPS receiver, contains a GPS receiver, or communicatively connects to a GPS receiver. In addition, each base station detects GPS-receiver signal transmissions within a particular region, and relays this information to the location-determination server. One of ordinary skill will realize that the base station can use a variety of communication architectures and networks to relay the signals from the GPS receivers to the location-determination server. In some embodiments, the base station is a cell tower that provides wireless communications to the client device 305.

The location-determination server 300 performs the process 200 for a particular GPS receiver whenever it receives the digital GPS reference data $s_1, \ldots, s_K$ from the particular GPS receiver. In addition to the receiver's reference GPS data, the server 300 uses several other data items to perform process 200, in some embodiments of the invention. For instance, some embodiments use an approximate location of the GPS receiver to compute pseudoranges for several satellites. In the embodiments described below, the approximate location is represented in terms of a three-dimensional vector $\hat{l}$, which represents a point in an Earth-centered, Earth-fixed coordinate system. Some embodiments specify this approximate location to be within ±150 Km of the actual GPS receiver location.

Different embodiments identify the approximate location $\hat{l}$ differently. In the embodiments described below, the approximate location is the location of the base station 310 that relays the GPS reference data generated by the receiver. Some of these embodiments extract the approximate-location information from the signal forwarded by the base station. In other embodiments, the server 300 uses the base-station's identification to retrieve the base-station location information from a storage structure (such as database 315 of FIG. 3) that stores the location of all base stations. Other embodiments determine the approximate location $\hat{l}$ by measuring signal strength between the base station 310 and the client device 305, using time-difference of arrival (TDOA), angle of arrival (AOA), and/or sector of arrival (SOA) methods at the base stations. Yet other embodiments identify the approximate location as the last GPS-receiver's location that was recorded within a predetermined time interval of the current first-sample time. One of ordinary skill will realize that other embodiments use numerous other approaches to identify the approximate GPS-receiver location.

In some embodiments, the data-processing server also needs to have access to differential GPS data, satellite clock-correction data, navigation bits, and ephemeris data. The server can receive such data from a variety of sources. For instance, as shown in FIG. 3, the server can receive such data from one or more reference GPS receivers 320 through one or more communication networks 325, such as the Internet.

To perform the process 200 for a particular GPS receiver, the location-determination server 300 initially computes (at 205) the approximate location of all GPS satellites at the time that these satellites transmitted the signals resulting in the first sample $s_1$ of the GPS reference data. This computation is further described below in Section II.A by reference to FIG. 4.

The process next identifies (at 210) N GPS satellites that are over the GPS receiver's approximate location $\hat{l}$. This identification is further described below in Section II.B by reference to FIGS. 5 and 6. After identifying the N overhead satellites for the approximate location $\hat{l}$, the process 200 computes (at 215) phase offsets for P satellites, where P is a number equal to or less than N. This computation is further described below in Section II.C by reference to FIG. 7.

For each of the P satellites, the process then computes (at 220) a pseudorange from its computed code phase, the GPS-receiver's approximate location, and the satellite's approximate location. As further described below, each satellite's approximate location is computed based on the approximate first-sample time $\tilde{t}_1$, which is based on the receiver clock. The computation of the pseudoranges is further described below in Section II.D by reference to FIGS. 8–10.

The process 200 then uses (at 225) the computed pseudoranges to calculate the GPS receiver's estimated location. Some embodiments use triangulation techniques to calculate the GPS receiver's estimated location from the computed pseudoranges, as described below in Section II.E.

A. Computation of Satellite Locations

As mentioned above, the location-determination process 200 initially computes the approximate locations of the satellites at the time that these satellites transmitted the signals that resulted in the first sample $s_1$. The receiver generated this first sample at time $\tilde{t}_1$.

Given ephemeris and differential data, a location $y^i$ of a satellite i is for all practical purposes a deterministic function of the GPS time t. One set of equations for deriving a satellite's location from ephemeris and differential data is provided in Table 2.3 on page 38 of "Understanding GPS Principles and Applications," by Elliott Kaplan, Artech House, 1996. The computed satellite location is typically a three-dimensional vector ($y^i \in \Re^3$) that is defined in an Earth-centered, Earth-fixed coordinate system.

To compute the location of a satellite i, the process 200 needs to first compute the time that this satellite transmitted the signal resulting in the first sample. However, the exact transmission time is difficult to compute without performing signal tracking. Hence, the process 200 computes an approximate transmission time and location for each satellite, instead of computing the precise values of these parameters.

More specifically, the exact transmission time for each satellite i equals the actual first-sample time $t_1$ minus the actual signal-transit delay $\tau_i$ for the satellite. The signal-transit delay $\tau_i$ is the time between the satellite's transmission of the signal resulting in the first sample $s_1$ and the receiver's generation of the first sample. Equation (1) illustrates one manner of computing the exact signal transit delay $\tau_i$ of a satellite i.

$$\tau_i = H(l, y^i(t_1 - \tau_i)) = \frac{\|l - y^i(t_1 - \tau_i)\|}{c} + \tau_i^a + \tau^r \quad (1)$$

In this equation, l is the receiver's exact position at first-sample time $t_1$, $y^i(t_1-\tau_i)$ is the satellite's precise location at exact transmission time $(t_1-\tau_i)$, c is the speed of light, $\tau_i^a$ is delay due to atmospheric conditions, $\tau^r$ is delay caused by analog processing at the receiver.

The location-determination process 200 can determine atmospheric-delay $\tau_i^a$ by using differential data. It can also retrieve from a storage structure (such as data storage 315) the processing-delay $\tau^r$ associated with each GPS receiver. However, it is difficult to ascertain (1) the exact first-sample time $t_1$, (2) the receiver's precise location l at exact first-sample time $t_1$, or (3) the satellite's precise location $y^i(t_1-\tau_i)$ at precise transmission time $(t_1-\tau_i)$. Hence, it is difficult to solve the Equation (1) to obtain an exact value for the signal-transit delay $\tau_i$.

Therefore, in some embodiments, the location-determination process 200 (at 205) computes for each satellite i the approximate signal transit delay $\tilde{\tau}_i$ of the satellite. Equation (2) below illustrates one manner of computing an approximate signal-transit delay $\tilde{\tau}_i$. This equation assumes that (1) the first-sample time is $\tilde{t}_1$, (2) the receiver is located at the approximate location $\hat{l}$, and (3) the satellite's location at transmission time equals its location at the approximate first-sample time $\tilde{t}_1$.

$$\tilde{\tau}_i = H\left(\hat{l}, y^i(\tilde{t}_1)\right) = \frac{\left\|\hat{l}, y^i(\tilde{t}_1)\right\|}{c} + \tau_i^a + \tau^r \quad (2)$$

As mentioned above, some embodiments use the base-station tower location as the approximate GPS-receiver location $\tilde{l}$, and retrieve the tower location from a database by using the received cell tower identification.

For each satellite i, this process can thus compute an approximate transmission time $(\tilde{t}_1-\tau_i)$ based on the approximate first-sample time $\tilde{t}_1$ and the satellite's approximated signal-transit delay $\tau_i$. Accordingly, for each satellite i, the process computes the satellite's approximate location $y^i(\tilde{t}_1-\tau_i)$ at the computed approximate transmission time $(\tilde{t}_1-\tau_i)$, by using the ephemeris and differential data. As mentioned above, one set of equations for deriving a satellite's location given ephemeris and differential data are provided in Table 2.3 on page 38 of "Understanding GPS Principles and Applications," by Elliott Kaplan, Artech House, 1996.

It can be shown that the approximate satellite location that is computed under this approach is no more than few meters off from the true satellite location at the time of transmission. Approximate location errors of less than 150 km will lead to no loss in accuracy, while errors in the receive time are less than four meters per millisecond. When receiver are part of a network (such as a cellular network), the receiver clocks are much more accurate than one millisecond. In the remainder of this document, the symbol $\tilde{y}^i$ is used as shorthand for the approximate satellite location $y^i(\tilde{t}_1-\tau_i)$.

Figure 4:
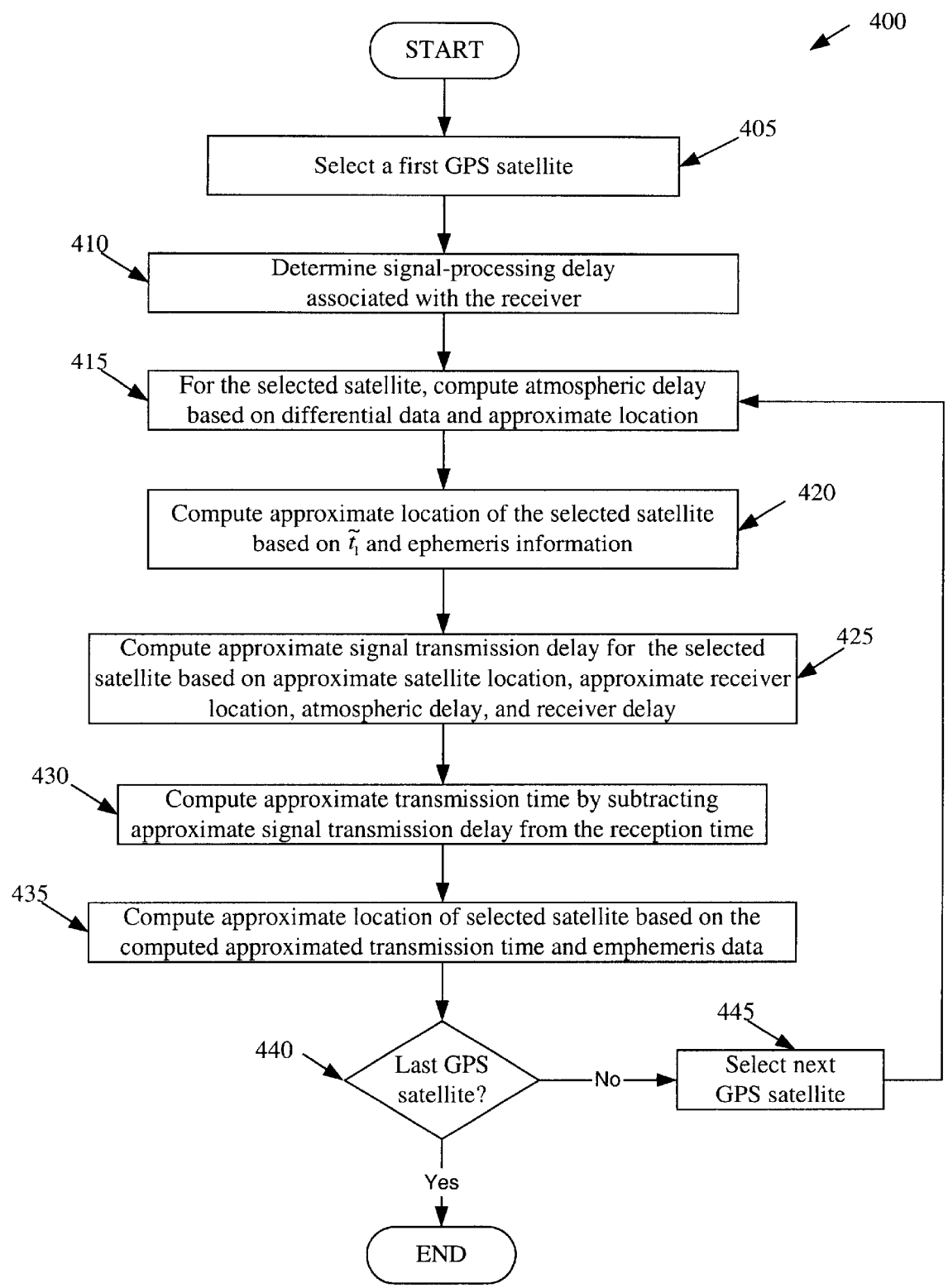
FIG. 4 illustrates a process that calculates the approximate location of GPS satellites at a particular transmission time.

FIG. 4 illustrates a process 400 that uses the above-described approach to calculate the approximate location of each GPS satellite i at the approximate time $(\tilde{t}_1-\tau_i)$ that the satellite transmitted the signal resulting in the first generated sample. This process is used by process 200 at 205, in some embodiments of the invention.

As shown in FIG. 4, the process 400 initially selects (at 405) a first GPS satellite i from a list of GPS satellites that it has. The process then determines (at 410) the signal-processing delay $\tau^r$ associate with receiver. Some embodiments store in a storage structure the processing-delay $\tau^r$ associated with each GPS receiver that can be used with the process 200 and the location-determination server 300. Hence, in these embodiments, the process 400 retrieves from the storage structure the processing-delay $\tau^r$ associated with the particular GPS receiver at issue.

Next, for the selected satellite, the process computes (at 415) the atmospheric delay $\tau_i^a$. This atmospheric delay can be derived from the received differential GPS data and the approximate receiver location $\tilde{l}$. One manner for deriving atmospheric delay at a location from received differential GPS data is disclosed in Chapter 8 of "Understanding GPS Principles and Applications," by Elliott Kaplan, Artech House, 1996.

At 420, the process then computes the selected satellite's approximate location $y^i(\tilde{t}_1)$ at the approximate first-sample time $\tilde{t}_1$. In some embodiments, the process computes this location at the time $\tilde{t}_1$ from the ephemeris and differential data by using the set of equations provided in Table 2.3 on page 38 of "Understanding GPS Principles and Applications," by Elliott Kaplan, Artech House, 1996.

After computing the approximate location of the satellite at time $\tilde{t}_1$, the process 400 computes (at 425) the approximate signal-transit delay $\tau_i$ of the selected satellite. This process uses the above-described Equation (2) to compute the approximate signal-transit delay $\tau_i$ from the approximate satellite location $y^i(\tilde{t}_1)$ (computed at 420), the signal-processing and atmospheric delays $\tau^r$ and $\tau_i^a$ (respectively obtained at 410 and 415), and the approximate receiver location $\tilde{l}$.

Next, the process computes (at 430) the approximate transmission time $(\tilde{t}_1-\tau_i)$ for the selected satellite by subtracting the approximate signal-transit delay $\tau_i$ (computed at 425) from the approximate first-sample time $\tilde{t}_1$. The process then computes (at 440) the selected satellite's approximate location $\tilde{y}^i$ at the approximate transmission time $(\tilde{t}_1-\tau_i)$ computed at 435. In some embodiments, the process computes this location from the ephemeris and differential data by using the set of equations provided in Table 2.3 on page 38 of "Understanding GPS Principles and Applications," by Elliott Kaplan, Artech House, 1996.

After computing the selected satellite's location at the approximate transmission time, the process determines (at 440) whether the selected satellite is the last GPS satellite on its GPS-satellite list. If not, the process selects (at 445) another GPS satellite from this list, and repeats 415 to 435 in order to determine this newly-selected satellite's approximate location. Otherwise, the process end as it has computed location of all the GPS satellites at the approximate time they transmitted their signals that resulted in the first generated sample.

B. Identification of Overhead Satellites

After identifying the approximate location of the GPS satellites, the process 200 identifies (at 210) the satellites that are currently "overhead." In some embodiments, the process 200 identifies the "overhead" satellites by making a simplifying assumption that satellites are overhead relative to the client device 305 if and only if they are overhead relative to the approximate location $\tilde{l}$.

Hence, in these embodiments, the process 200 examines each satellite i and determines whether the satellite is over the approximate location $\tilde{l}$. In some embodiments, the process specifies a satellite i as an overhead satellite if and only if $\tilde{l}'\tilde{l} \leq \tilde{l}'\tilde{y}^i$. (Note that the "prime" denotes vector transposition.) In other words, the process designates satellite i as an overhead satellite if and only if the inner product of the satellite's approximate position vector $s_i$ with the approximate location vector $\tilde{l}$ is greater than or equal to the inner product of the approximate location vector with itself.

This designation criterion essentially determines whether the magnitude of the projection of a satellite's approximate position vector $y^i$ onto the approximate location vector $\tilde{l}$ is greater than or equal to the magnitude of the approximate location vector $\tilde{l}$. If so, the satellite is an overhead satellite.

Figure 5:
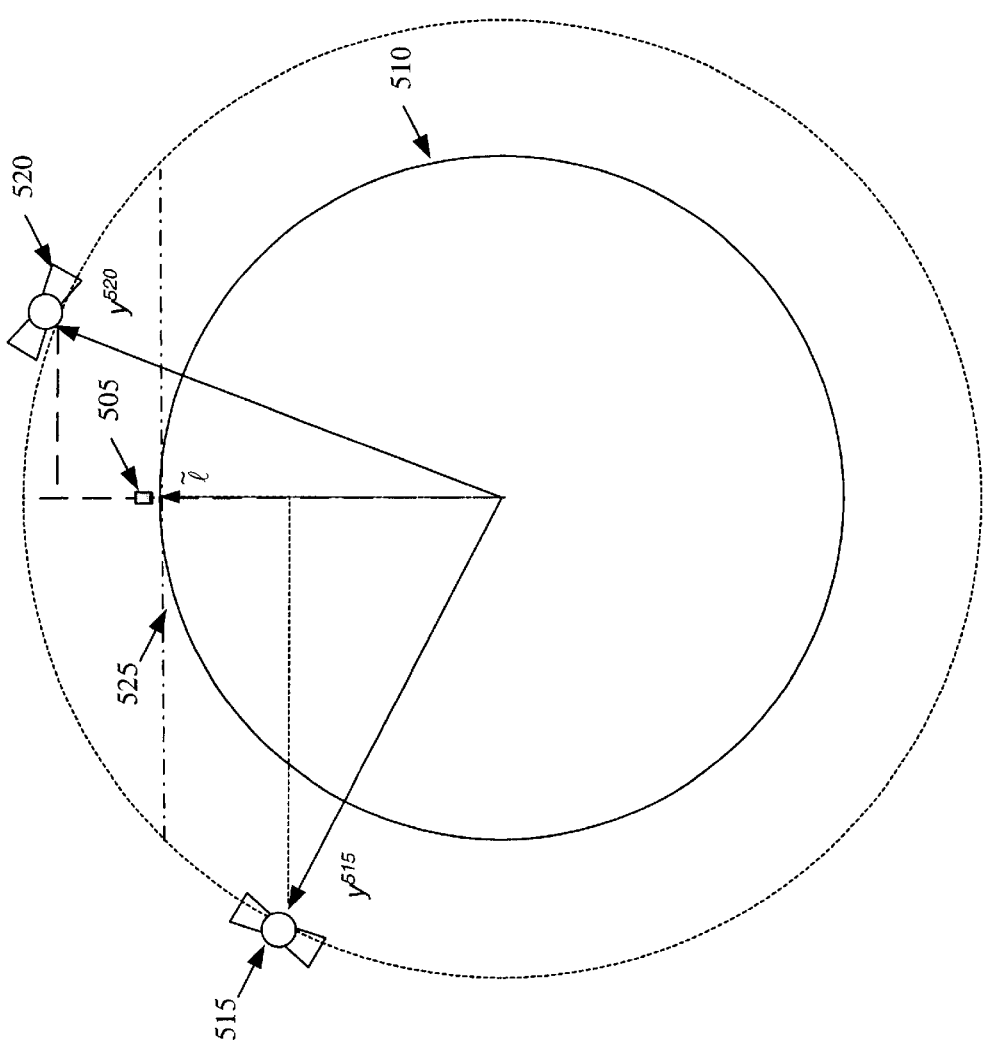
FIG. 5 illustrates one satellite that is "over" an approximate location and another satellite that is not "over" the approximate location.

FIG. 5 pictorially illustrates this designation criterion. This figure presents a GPS receiver 505 at the approximate location $\tilde{l}$on Earth 510, and two satellites 515 and 520 that orbit the Earth. The satellite 515 is not an overhead satellite as it is beneath the horizon 525 of the location $\tilde{l}$. Accordingly, the magnitude of the projection of its position vector $y^{515}$ onto the approximate location vector $\tilde{l}$ is less than the magnitude of the approximate location vector $\tilde{l}$. On the other hand, the satellite 520 is an overhead satellite as it is above the horizon 525 of the location $\tilde{l}$. Hence, the magnitude of the projection of its position vector $y^{520}$ onto the approximate location vector $\tilde{l}$ is greater than the magnitude of the approximate location vector $\tilde{l}$.

Figure 6:
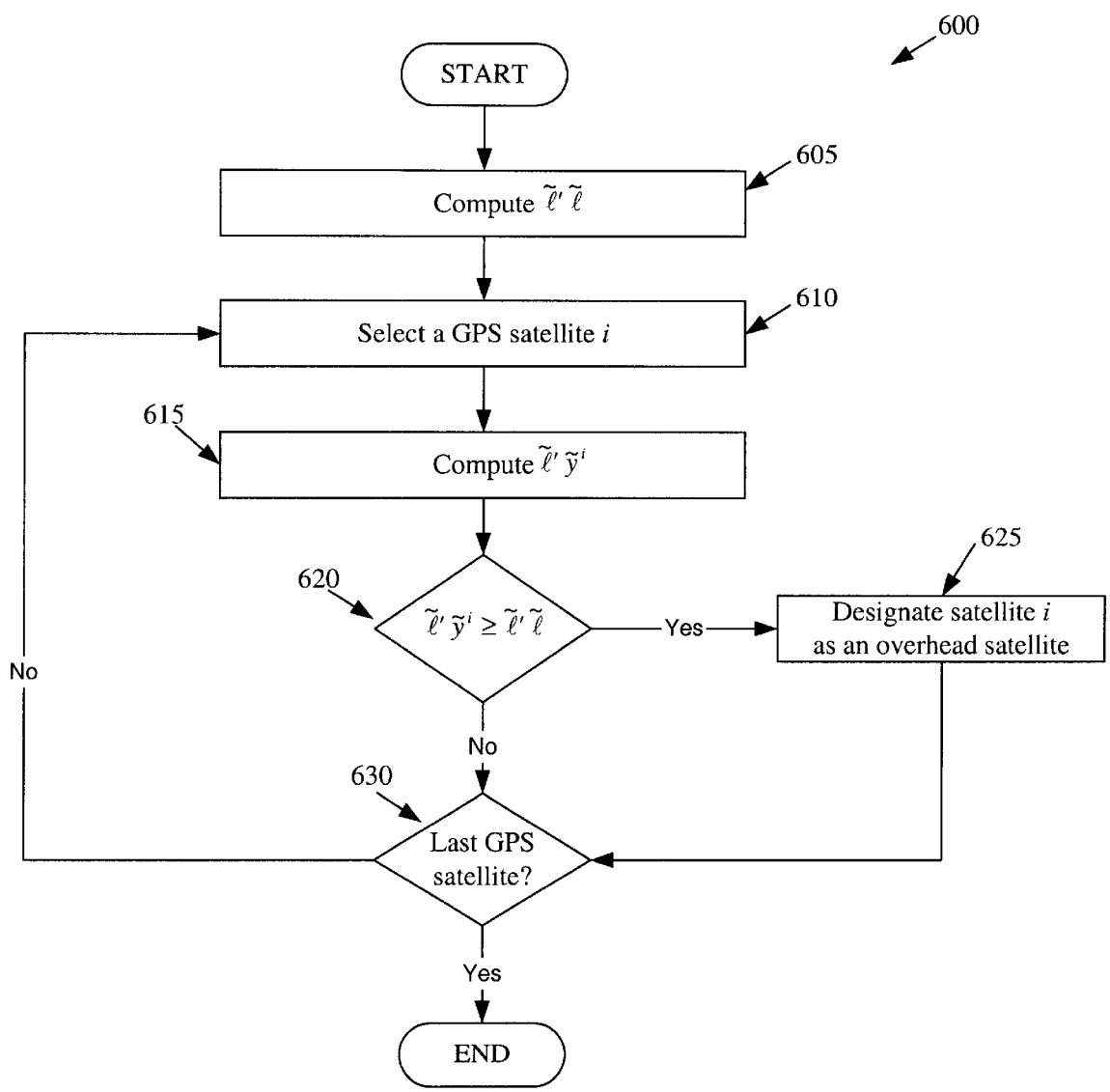
FIG. 6 illustrates a process that identifies satellites that are over an approximate location.

FIG. 6 illustrates a process 600 that uses the above-described approach to identify the overhead satellites. This process is used by process 200 at 210, in some embodiments of the invention. As shown in FIG. 6, the process 600 initially computes (at 605) the inner product of the approximate location vector $\tilde{l}$ with itself.

The process 600 next selects (at 610) a GPS satellite from a list of GPS satellites that it has. The process then computes (at 615) the inner product of the approximate location vector $\tilde{l}$ with the selected satellite's approximate location vector $\tilde{y}^i$, which was computed at 205.

At 620, the process 600 determines whether the inner product generated at 615 is greater or equal to the inner product generated at 605. If not, the process transitions to 630, which will be described below. Otherwise, the process designates (at 625) the satellite selected at 610 as an overhead satellite, and then transitions to 630.

At 630, the process determines whether it has examined all the GPS satellites on its list of GPS satellites. If not, the process returns to 610 to select another GPS satellite from this list, and repeats the above-described operations in order to determine whether the newly-selected satellite is an overhead satellite or not.

Once the process determines (at 630) that it has examined all the GPS satellites, the process ends. Typically, by the time that the process 600 ends, this process has identified some integer number N of the GPS satellites as overhead satellites.

C. Computation of Phase Offsets

After identifying the overhead satellites for the approximate location $\hat{l}$, the process 200 computes (at 215) phase offsets for the overhead satellite. One method for computing phase offsets is described below. However, one of ordinary skill will realize that a variety of other methods may be used to compute phase offsets.

A phase offset for a satellite is the phase difference between (1) the satellite's PRN code that is part of the received GPS reference data, and (2) a replica of the satellite's PRN code that is used by process 200. The process 200 computes a satellite's phase offset by computing an ambiguity function $A_i(\hat{\phi}, \hat{f}_D)$, which is the square of the magnitude of the inner product $R_i(\hat{\phi}, \hat{f}_D)$ between the received GPS reference data with the replica of the satellite's PRN code at various candidate phase offsets $\hat{\phi}$ and Doppler-shift values $\hat{f}_D$. Equations (3) and (4) provide mathematical representations of the ambiguity and correlation functions.

$$A_i(\hat{\phi}, \hat{f}_D) = |R_i(\hat{\phi}, \hat{f}_D)|^2, \quad (3)$$

$$R_i(\hat{\phi}, \hat{f}_D) = \frac{1}{K} \sum_{k=1}^{K} \bar{x}_i(t_k - \tilde{t}_1 - \hat{\phi}) \tilde{s}_k^{\hat{f}_D} \quad (4)$$

In these equations, (1) $t_k$ denotes the GPS time of the $k^{th}$ sample, (2) $\tilde{s}_k^{\hat{f}_D}$ is the $k^{th}$ sample after the candidate Doppler-shift value has been applied to it, (3) the candidate Doppler-shift value $\hat{f}_D$ represents the sum of the satellite Doppler and the clock Doppler values, and (4) $\bar{x}_i(t)$ is a bandpass filtered version of the satellite's C/A code replica $x_i(t)$ (modulated by the navigation bits) that the process 200 uses. The Doppler-shift value is applied to the $k^{th}$ sample by multiplying this sample by $e^{-2\pi j(f_{IF}+\hat{f}_D)(t_k-t_1)}$.

In some embodiments, the search through candidates ($\hat{\phi}$, $\hat{f}_D$) is exhaustive, and the phase offset of the candidate pair that resulted in the maximum ambiguity value for the satellite is selected as the phase offset of the satellite. As described below by reference to FIG. 7, some embodiments take this selection a step further. These embodiments use an ambiguity threshold ratio to detect useful phase offsets, and disregard satellites without useful phase offsets. For instance, some embodiments require a satellite's maximum ambiguity to exceed the average ambiguity by a constant ratio in order for its phase offset to be considered valid. In other embodiments, a variety of threshold tests can be used, such as ratio between highest ambiguity peak and next highest ambiguity peak.

Also, rather than computing the inner-product function $R_i(\hat{\phi}, \hat{f}_D)$ as a sum of a series of multiplications for each $\hat{\phi}$ and $\hat{f}_D$, some embodiments view $R(\cdot, \hat{f}_D)$ as a correlation. In one embodiment, the correlation theorem and fast Fourier transforms ("FFT") are used to improve computation time.

Figure 7:
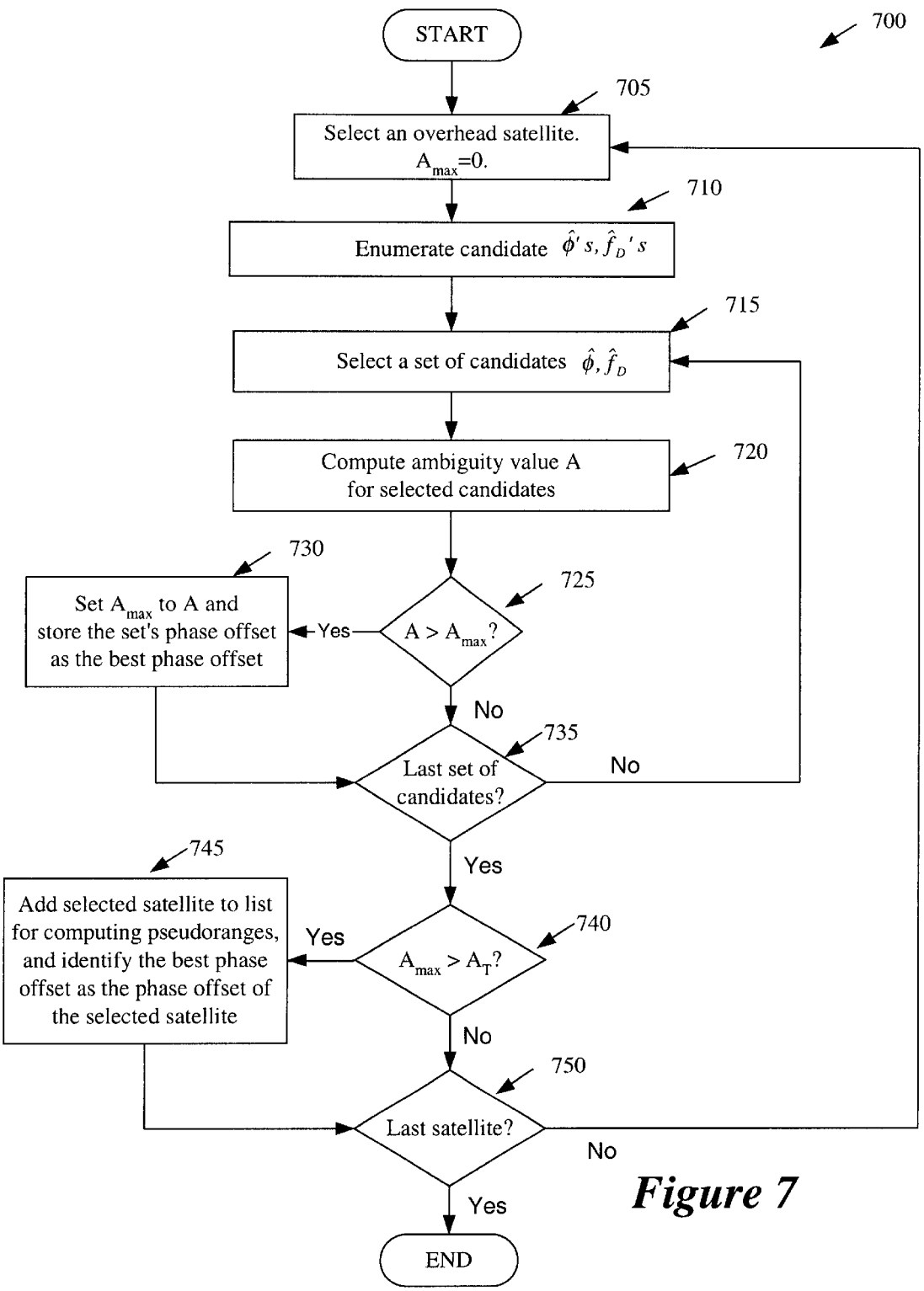
FIG. 7 illustrates a process that computes phase offsets for several satellites.

FIG. 7 presents a process 700 for computing useful phase offsets for several of the overhead satellites. The process 200 performs (at 215) the process 700 after it has identified the overhead satellites. The process 700 initially (at 705) selects an overhead satellite and defines this satellite's maximum ambiguity value to be equal to 0.

Next, the process 700 enumerates (at 710) a number of candidate phase offsets $\hat{\phi}$'s and Doppler-shift values $\hat{f}_D$'s for the selected satellite. The process then selects (at 715) a candidate phase offset $\hat{\phi}$ and Doppler-shift value $\hat{f}_D$, and computes (at 720) the ambiguity value for the selected candidate pair by using Equations (3) and (4) above.

The process next determines (at 725) whether the ambiguity value computed at 720 is greater than the maximum ambiguity value recorded for the selected satellite thus far. If not, the process transitions to 735, which will be described below. If so, the process (at 730) sets the maximum ambiguity value equal to the value computed at 720, and stores the satellite's phase offset as the best phase offset thus far. The process then transitions to 735.

At 735, the process determines whether it has examined all the candidate pairs. If not, the process returns to 715 to select another candidate pair. Otherwise, the process determines (at 740) whether the selected satellite's maximum ambiguity value exceeds a threshold ambiguity value. If so, the process adds (at 745) the selected satellite to the list of satellite's for which a pseudorange needs to be computed, and records the best phase offset stored at 730 for this satellite as its phase offset.

From 745, the process transitions to 750. The process also transitions to 750 if it determines (at 740) that the selected satellite's maximum ambiguity value does not exceed the threshold ambiguity value. At 745, the process determines whether it has examined all the overhead satellites. If not, the process returns to 705 to select another satellite. Otherwise, the process ends.

D. Computation of Pseudoranges

After computing phase offsets for several overhead satellites, the process 200 then uses (at 220) the receiver's approximate location and the computed phase offsets to compute pseudoranges for the set of satellites. To compute a satellite's pseudorange, the process 200 calculates the length of all or most of the PRN codes transmitted by the satellite from the time that it transmitted the signal resulting in the first sample $s_1$ to the time the receiver generated the first sample $s_1$.

As mentioned above, signal-transit delay refers to this time duration (i.e., it is the time between the satellite's transmission of the signal resulting in the first sample $s_1$ and the receiver's generation of the first sample $s_1$). During the $i^{th}$ satellite's signal-transit delay, satellite i transmits several PRN codes.

Figure 8:
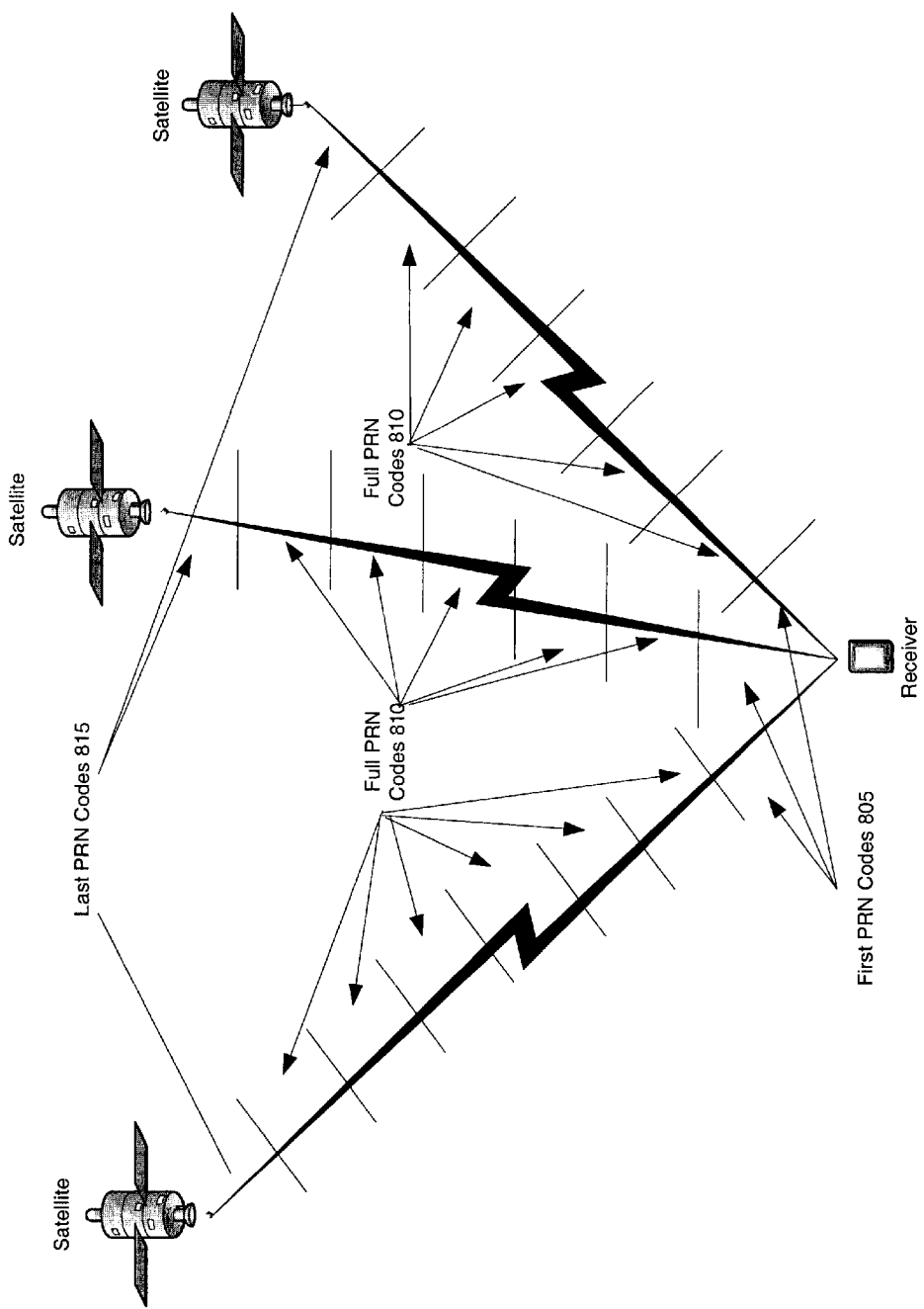
FIG. 8 illustrates the type of code segments that a GPS receiver receives from several GPS satellites.

FIG. 8 illustrates that these PRN codes can be grouped in three categories. The first category is the PRN code segment 805 that contains the signal resulting in the first sample $s_1$. In the discussion below, this PRN code segment is referred to as the first PRN code segment. The first PRN code segment 805 is said to be a complete or practically complete segment when the signal resulting in the first sample is part of the first PRN-code chip, and it is said to be a partial segment when the signal resulting in the first sample is part of a chip after the first PRN-code chip.

The second category includes the full PRN codes 810 that the satellite transmitted after the first PRN code but before the first-sample time. In the discussion below, these PRN codes are referred to as the full PRN codes. The third category is the PRN code 815 that the satellite is transmitting when the receiver generates the first sample. In the discussion below, this PRN code segment is referred to as the last PRN code segment 815. The last PRN code segment 815 is said to be a complete or practically complete segment when at the first-sample time the satellite is transmitting the last chip of this code, and it is said to be a partial segment when at the first-sample time the satellite is transmitting a chip before the last chip of this code Equation (5) below illustrates one manner of computing the estimated distance between the GPS receiver and the $i^{th}$ satellite by summing the length first, last, and full PRN code segments after accounting for differential corrections and the satellite-clock's error. In other words, Equation (5) provides the mathematical representation of a pseudorange $92_i$ for the $i^{th}$ satellite.

$$\rho_i = p_i + m_i l + (cv_i + d_i^\epsilon) + d_i \tag{5}$$

In this equation, (1) $p_i$ is the length of the first code segment, (2) $m_i$ is the number of full PRN codes, (3) l is the full-PRN-code length, which is about 300 Km, (4) $v_i$ is the $i^{th}$ satellite's transmission phase, (5) c is the speed of light, (6) $cv_i$ is the length of the last PRN code without adjustment for the satellite clock error, (7) $d_i^\epsilon$ is the satellite-clock-error correction factor, and (8) $d_i$ is the atmospheric-error-correction factor.

Accordingly, in Equation (5), (1) the first term ($p_i$) accounts for the length of the first code segment, (2) the second term ($m_i l$) accounts for the length of the full PRN codes, (3) the third term ($cv_i + d_i^\epsilon$) accounts for the length of the last PRN code after adjustment for satellite-clock error, and (4) the fourth term ($d_i$) accounts for atmospheric delay.

Figure 9:
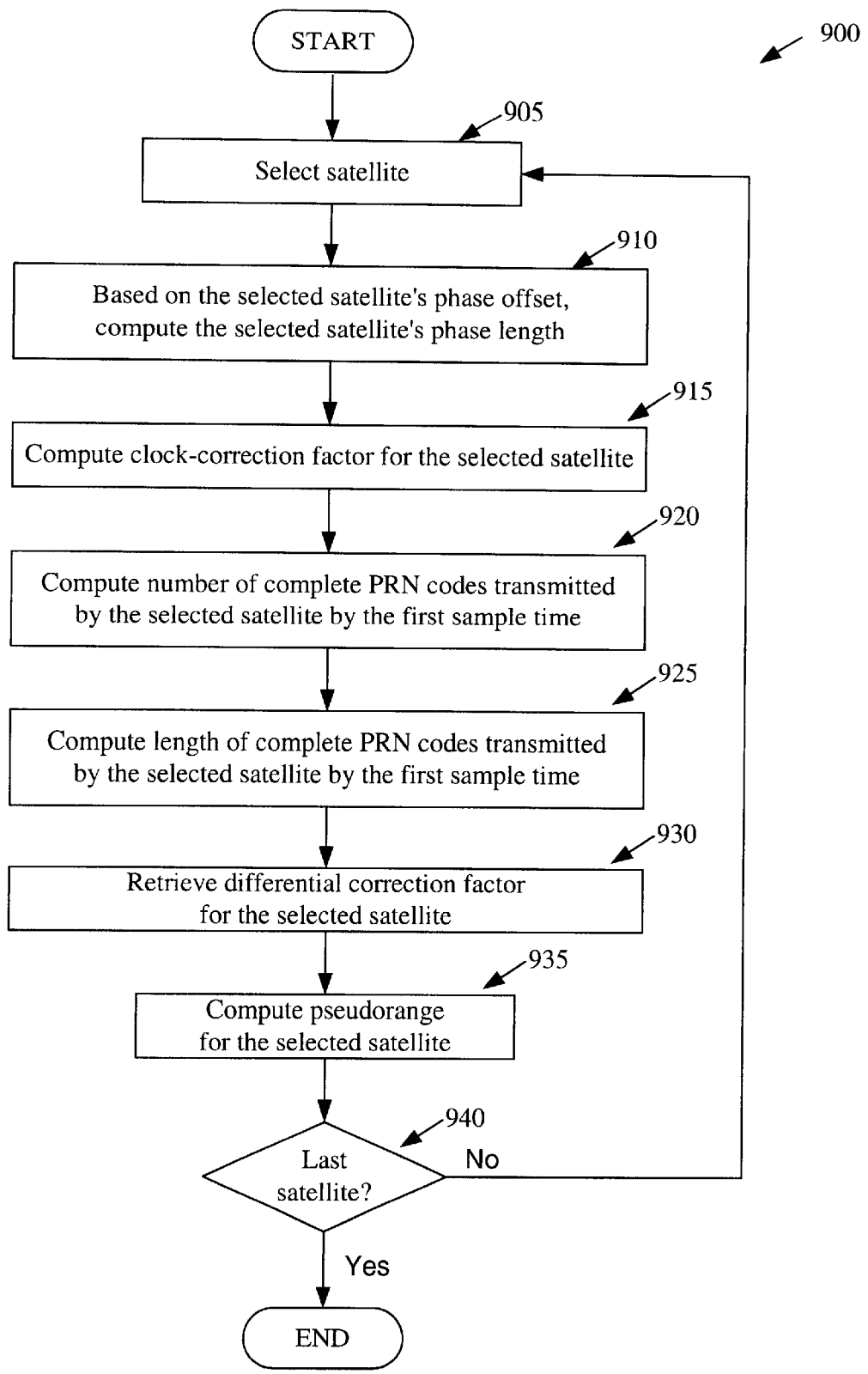
FIG. 9 illustrates a process for computing pseudoranges.

FIG. 9 illustrates a process 900 for computing a satellite's pseudorange according to Equation (6) below.

$$\mu_i = p_i + m_i l + d_i^\epsilon + d_i \tag{6}$$

Equation (6) provides the mathematical representation for computing another pseudorange $\rho_i$ for the $i^{th}$ satellite. Equation (6) is similar to Equation (5) except that it does not include $cv_i$, which is the last-PRN-code's length without adjustment for satellite clock error. As further described below, the process 900 does not compute $cv_i$, but rather leaves it to a subsequent triangulation operation to account for this term for all the P satellites together.

1. Computing the Length of the First PRN Code Segment

Figure 10:
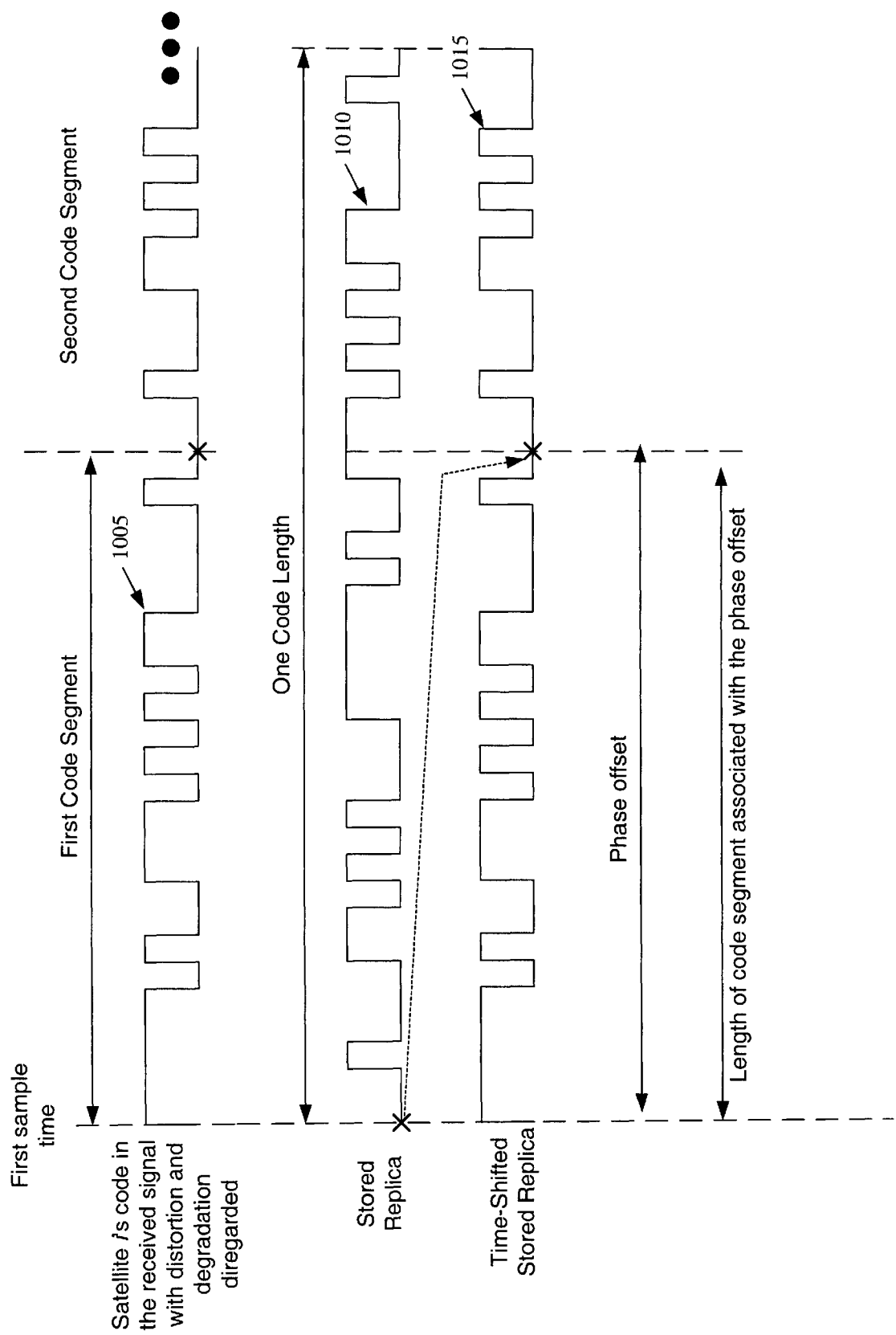
FIG. 10 illustrates a PRN code received by a GPS receiver, a replica of this code stored by the GPS receiver, and a phase-shifted version of this replica.

The length $p_i$ of the first code segment 805 of satellite i is the code length associated with the phase offset $\phi_i$ of this satellite. Accordingly, this code length is referred to as phase length in the discussion below. FIG. 10 illustrates the relationship between the phase length and phase offset of satellite i. This figure presents three codes. The first code 1005 is the $i^{th}$ satellite's PRN code in the received signal. (In this figure, the illustration of the received PRN code disregards degradation and distortion in the received signal.)

The second code is a replica 1010 of the $i^{th}$ satellite's PRN code that the location-determination process uses. FIG. 10 illustrates the length of complete code replica. The third code is a version 1015 of the replica that has been shifted by a phase offset to perfectly match the received code 1005. As shown in FIG. 10, the phase length associated with the phase offset equals the length of the first code segment in the received signal.

When the phase offset $\phi_i$ is represented as a normalized-time value between 0 to 1, the $i^{th}$ satellite's phase length $p_i$ is represented by Equation (7) below:

$$p_i = \phi_i c. \tag{7}$$

The phase length can be expressed differently. For instance, it can be expressed differently when the phase offset is represented differently.

2. Computing the Length of Full PRN Code Segments

To compute the length of the full PRN codes 810 that the $i^{th}$ satellite transmitted after the first PRN code 805 but before the first-sample time, some embodiments first compute the number $m_i$ of these complete codes. Equation (8) provides a mathematical representation for calculating this number.

$$m_i = \text{round}\left\{ \frac{\left\| \tilde{y}^i - \tilde{l} \right\| - (p_i + d_i^\epsilon)}{l} \right\} \tag{8}$$

As illustrated by this equation, the number of full PRN codes can be estimated based on the $i^{th}$ satellite's approximate location $\tilde{y}^i$, the GPS-receiver's approximate location $\tilde{l}$, the $i^{th}$ satellite's computed phase length $p_i$, and the PRN-code-length l. Specifically, this number can be estimated by (1) subtracting the satellite's approximate location from the GPS-receiver's approximate location to obtain an approximate distance between the satellite and receiver, (2) subtracting the phase length plus distance correction factor $d_i^\epsilon$ from this distance, (3) dividing the resulting value by the PRN-code-length l, and (4) rounding the result of the division to the closest integer value. The calculation of the distance correction factor $d_i^\epsilon$ is discussed in the following subsection. Once the number of full PRN codes is estimated, the length of these codes can be obtained by multiplying this number by the PRN-code-length l, as mentioned above.

3. Computing the Length of the Last PRN Code Segment and Adjusting for Satellite-clock Error So long as the GPS-satellite clocks are all synchronized by accounting for the satellite-clock errors, the length of the last code segment 815 is equal for all P satellites. Hence, as mentioned above, the process 900 below sets the unadjusted last-PRN-code length ($cv_i$) to zero, and leaves it to a subsequent triangulation operation to account for this term for all the P satellites together.

As mentioned above, Equation (6) includes a distance correction factor $d_i^\epsilon$ to account for the satellite-clock errors. Equation (9) provides one formula for calculating this error correction factor.

$$d_i^\epsilon = \epsilon_i c \tag{9}$$

In this equation, $\epsilon_i$ is the satellite-clock error, which in some embodiments is retrieved by the location-determination process from a GPS receiver 320 through the communication networks 325.

4. Adjusting for Differential Corrections

As mentioned above, Equation (6) includes a differential correction factor $d_i$. This correction factor is to account for signal-path delays due to atmospheric conditions and other effects. This differential correction factor can be obtained from a variety of sources, including third-party vendors, publicly available data via the communication network 325 (e.g. www.ngs.noaa.gov/CORS/cors-data.html), readings of an independent GPS receiver and other sources.

5. Pseudorange-computing Process 900

The pseudorange-computing process 900 of FIG. 9 will now be described. This process initially selects (at 905) one of the P satellites that the process 700 selected for computing their pseudoranges. Next, the process uses (at 910) the above-described Equation (7) to compute the selected satellite's phase length $p_i$ from its phase offset $\phi_i$, which was computed by process 700.

The process then uses (at 915) Equation (9) to compute distance correction factor $d_i^\epsilon$ due to the satellite-clock error. As mentioned above, some embodiments retrieve the satellite-clock error $\epsilon_i$ from a GPS receiver 320 through the communication networks 325. At 920, the process uses Equation (8) to compute the number of the full PRN codes 810 that the selected satellite transmitted after the first PRN code 805 but before the first-sample time. The process 900 next computes (at 925) the length of these full PRN codes by multiplying the number computed at 915 by the PRN-code-length l, which is about 300 Km. At 930, the process then identifies an atmospheric-delay correction factor $d_i$.

The process then computes (at 935) the selected satellite's pseudorange by summing the values computed at 910, 920, 925, and 930. The process 900 then determines (at 940) whether it has generated pseudoranges for all the P satellites identified by process 700. If not, the process returns to 905 to select the next satellite, and repeat 910–935 to compute the newly-selected satellite's pseudorange. Otherwise, the process ends.

E. Triangulation of Pseudoranges to Determine Location

After computing pseudoranges, the process 200 then uses (at 225) the computed pseudoranges to calculate the GPS receiver's estimated location. Some embodiments use triangulation techniques to calculate the GPS receiver's estimated location from the computed pseudoranges.

There are multiple triangulation approaches, such as those discussed on pages 44–48 of "Understanding GPS Principles and Applications," by Elliot Kaplan, Artech House, 1996. One skilled in the art will realize that any one of these approaches can readily be used in conjunction with the invention to compute receiver location from the computed pseudoranges.

In some embodiments, the triangulation algorithm uses four satellites to compensate for a common uncertainty in the satellite distances, instead of compensating for the receiver clock error, which is the traditional GPS interpretation for using four satellites during triangulations. As discussed in Section II.D and FIG. 8, this uncertainty is the last PRN Codes 815. This term is common to all the satellites, and thus, by including four satellites, the triangulation algorithm can solve for this term. The receiver clock error and the uncertainty of the last PRN Code are equivalent manifestations of the same entity.

One of ordinary skill will realize that the above-described embodiments have several advantages. For instance, these embodiments do not perform signal tracking to compute the pseudoranges of satellites. Accordingly, these embodiments are faster than some of the prior techniques. In addition, these embodiments do not need several seconds of GPS data, as they do not extract the satellite time stamps.

While the invention has been described with reference to numerous specific details, one of ordinary skill in the art will recognize that the invention can be embodied in other specific forms without departing from the spirit of the invention. For instance, even though the embodiments described above use the commercial GPS frequency, other embodiments use the military GPS frequency, while others use both the military and commercial frequencies. Thus, one of ordinary skill in the art will understand that the invention is not to be limited by the foregoing illustrative details, but rather is to be defined by the appended claims.

We claim:

1. A global positioning system, comprising:
   a) using a global positioning system ("GPS") receiver to receive a GPS signal;
   b) computing a pseudorange for a GPS satellite without performing signal tracking on the received GPS signal; and
   c) using the computed pseudorange in a triangulation method that resolves an uncertainty in the last code segment transmitted by the satellite at the time the GPS signal is received to identify an estimated location of the GPS receiver.

2. The global positioning method of claim 1 further comprising:
   a) computing pseudoranges for at least two other GPS satellites without performing signal tracking on the received GPS signal; and
   b) using the computed pseudoranges to perform triangulation to identify the estimated location of the GPS receiver.

3. A method of computing a pseudorange for a GPS receiver and a GPS satellite, wherein the GPS receiver receives a GPS signal and the GPS satellite repeatedly transmits a code, the method comprising
   a) identifying a phase offset between the received GPS signal and a replica of the satellite's code, wherein the phase offset corresponds to a particular segment of the code;
   b) identifying an approximate GPS-receiver location;
   c) identifying an approximate time for the received GPS signal;
   d) computing the pseudorange for the GPS satellite based on the computed phase offset, the approximate GPS-receiver location, and the approximate time.

4. The method of claim 3, wherein the approximate GPS-receiver location is within 150 Km of the actual receiver location.

5. The method of claim 3, wherein the receiver has a clock that maintains time, the method further comprising maintaining the receiver-clock time to be within a predetermined time interval of GPS time.

6. The method of claim 5, wherein maintaining the receiver-clock time comprises synchronizing the receiver-clock time to match time generated by a reference clock.

7. The method of claim 6, wherein synchronizing the receiver-clock time comprises periodically synchronizing the receiver-clock time to match time generated by the reference clock.

8. The method of claim 5, wherein the predetermined time interval is 1 millisecond.

9. A method of computing a pseudorange for a receiver and a transmitter, wherein the receiver receives a reference signal starting at a particular time and the transmitter transmits a signal with a periodically-repeating component, the method comprising
   a) identifying a phase offset between the received reference signal and a replica of the transmitter signal's periodically-repeating component, wherein the phase offset corresponds to a particular segment of the periodically-repeating component;

b) computing the length of the particular segment;

c) computing the length of complete periodically-repeating components that the particular satellite has transmitted by the particular time after transmitting the particular segment;

d) calculating the pseudorange based on the computed lengths.

10. The method of claim 9, wherein calculating the pseudoranges comprises summing the computed lengths.

11. The method of claim 9, wherein identifying the phase offset includes correlating the received signal with a replica of the transmitter signal's periodically-repeating component at various phase offsets.

12. The method of claim 9, wherein computing the length of complete periodically-repeating components comprises:

a) calculating the number of complete periodically-repeating components that the particular satellite transmitted after the particular segment by the particular time; and b) multiplying the calculated number by the length of the complete periodically-repeating component.

13. The method of claim 9, wherein the transmitter is part of a GPS satellite and the receiver is a GPS receiver.

14. The method of claim 13, wherein the satellite includes a clock and the clock differs from GPS clock by some error amount, the method further comprising:

a) identifying the satellite's clock error amount;

b) generating an error-correction factor;

c) taking the error-correction factor into account in calculating the pseudorange.

15. The method of claim 14, a) wherein generating an error-correction factor comprises multiplying the error amount by the speed of light;

b) wherein taking the error-correction factor into account comprises adding the error-correction factor to the calculated pseudorange.

16. The method of claim 13, wherein calculating the pseudorange further comprises:

a) calculating an atmospheric-delay-correction factor for the satellite;

b) taking the correction factor into account in calculating the pseudorange.

17. The method of claim 16, wherein taking the correction factor into account comprises adding the correction factor to the calculated pseudorange.

18. For a global positioning system ("GPS") that includes a plurality of GPS satellites and a GPS-receiver, a method of identifying an estimated location of a GPS receiver, wherein each particular GPS satellite transmits a signal that includes a periodically-repeating code unique to the particular GPS satellite, wherein the GPS receiver receives a signal starting at a particular time, the method comprising a) for each particular GPS satellite in a set of the GPS satellites, 1) determining a phase offset between the received signal and a replica of the satellite's code, wherein the phase offset corresponds to a particular segment of the particular satellite's code;

2) computing the length of the code segment;

3) computing the length of complete codes that the particular satellite transmitted after the code segment by the particular time; and 4) calculating a pseudorange for the particular satellite based on the computed lengths; and b) identifying the estimated location of the receiver by using the computed pseudoranges.

19. The method of claim 18, wherein calculating the pseudorange for each particular satellite comprises summing the computed lengths for the particular satellite.

20. The method of claim 18, wherein identifying the phase offset for each particular satellite includes correlating the received GPS signal with a replica of the particular satellite's code at various phase offsets.

21. The method of claim 18, wherein computing the length of complete codes for each particular satellite comprises:

a) calculating the number of complete codes that the particular satellite transmitted after the code segment by the particular time; and b) multiplying the calculated number of complete codes by the length of the satellite's code.

22. The method of claim 18, wherein each satellite includes a clock and the clock differs from GPS clock by some error amount, the method further comprising:

for each particular satellite, a) identifying the particular satellite's clock error amount;

b) generating an error-correction factor;

c) taking the error-correction factor into account in calculating the pseudorange for the particular satellite.

23. The method of claim 22, a) wherein generating an error-correction factor comprises multiplying the error amount by the speed of light;

b) wherein taking the error-correction factor into account comprises adding the error-correction factor to the calculated pseudorange for the particular satellite.

24. The method of claim 18, wherein calculating the pseudorange for each particular satellite further comprises:

a) calculating an atmospheric-delay-correction factor for the particular satellite;

b) taking the correction factor into account in calculating the pseudorange for the particular satellite.

25. The method of claim 24, wherein taking the correction factor into account comprises adding the correction factor to the calculated pseudorange for the particular satellite.

26. The global positioning system as in claim 1, wherein the uncertainty relates to the position in the PRN code of the chip being transmitted by the satellite at the time the GPS receiver receives its first sample of the PRN code.

27. A method for determining a location of a receiver, including altitude information, the method comprising the steps of:

a) receiving a signal comprising a plurality of periodic location-determining signals from a plurality of signal sources;

b) providing timing information to said receiver that is accurate to within a predetermined time interval of less than one half of a period of one of said periodic location determining signals;

c) determining an approximate receiver location to within a predetermined spatial distance that is less than one half of said period multiplied by the speed of light;

d) using said timing information, said approximate receiver location and said signal, computing a pseudorange for each of four signal sources without performing signal tracking;

e) determining said location information based on the four said pseudoranges, without regard to the velocity of each of said signal sources.

28. A method as in claim 27, wherein said receiver is a global positioning system (GPS) receiver, said period is one millisecond, said predetermined time interval is 500 microseconds and said predetermined spatial distance is 150 Km.

* * * * *